United States Patent Office 3,385,410
Patented May 28, 1968

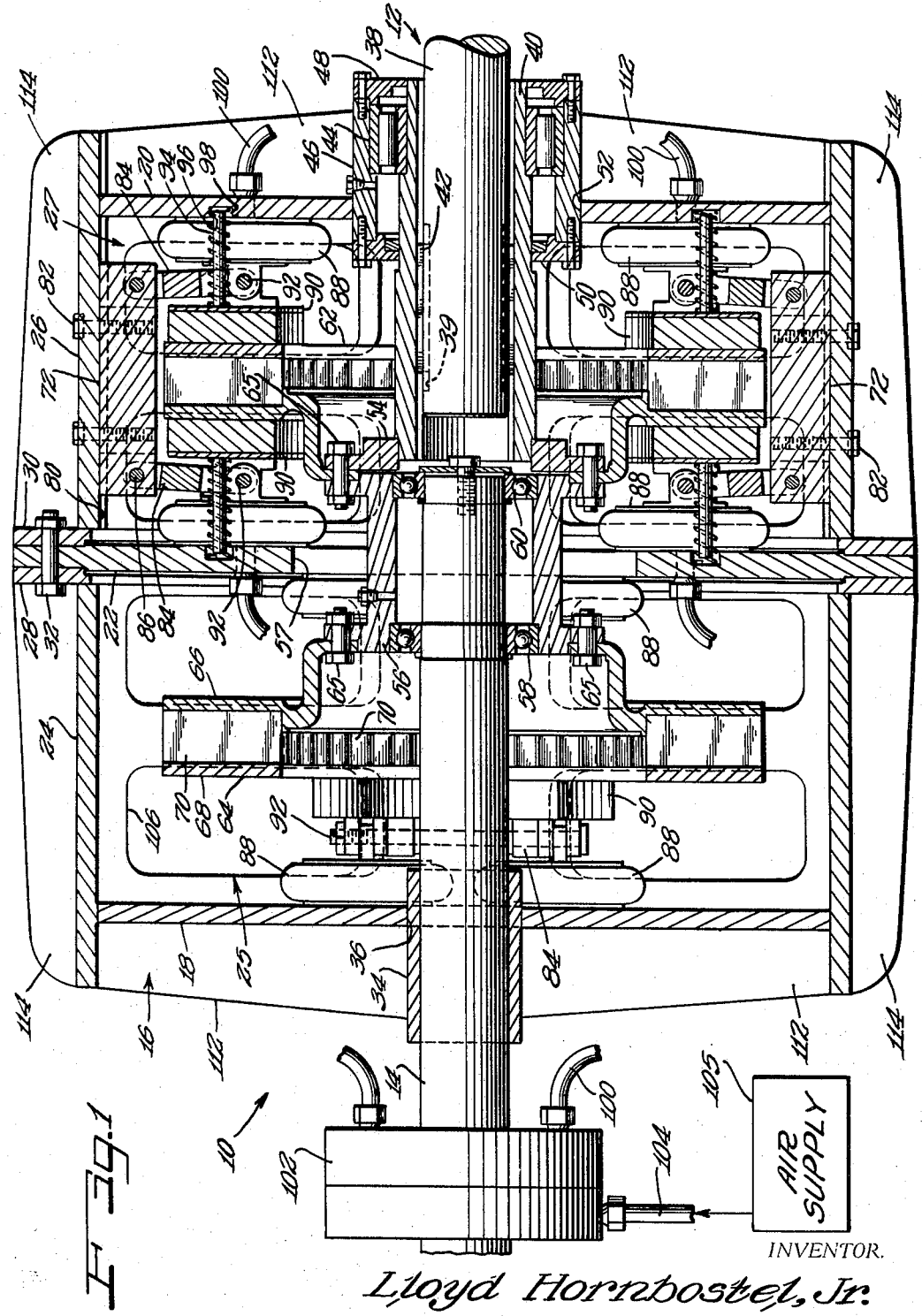

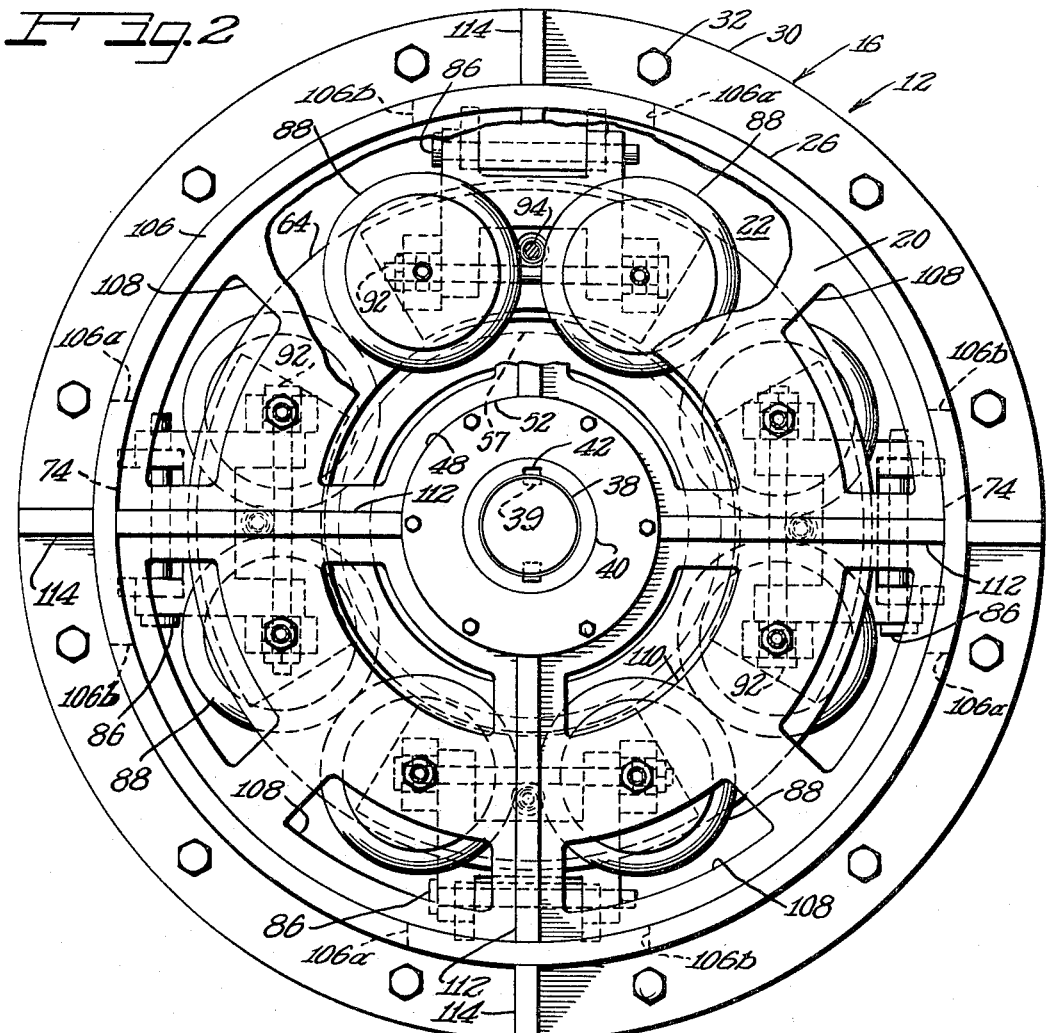

3,385,410
AIR CLUTCH WITH SHOES PIVOTED
ON LEVERS
Lloyd Hornbostel, Jr., Beloit, Wis., assignor to Beloit
Corporation, Beloit, Wis., a corporation of Wisconsin
Filed Apr. 13, 1966, Ser. No. 542,406
2 Claims. (Cl. 192—87.1)

ABSTRACT OF THE DISCLOSURE

The invention is directed to a clutching mechanism which includes a rotatable disc mounted on a shaft which is to be driven. A plurality of caliper-like brake shoes are secured to the driven portion of the clutch assembly for engaging the rotatable disc. A plurality of pneumatic expansible chambers are provided for actuating the brake shoes into contact with the disc to provide a coupling between the driven member and the output shaft of the clutch assembly.

This invention relates generally to a clutching assembly and more particularly to an air operated twin caliper, fan cooled clutch.

More specifically, the present invention has particular application in the handling of large amounts of power between a source of motive power and a machine to be driven and is designed primarily for use in the operation of paper machines.

One of the primary problems encountered in the design of clutches is that of maintaining the operating temperature of the clutch below a predetermined limit so as to maintain the operating conditions constant. If the temperature of a clutch exceeds a certain predetermined upper limit, the coefficient of friction of the engaging surfaces will not remain constant. Furthermore, when it is desired to operate a clutch with a constant slip, excessive temperatures will result in grabbing at the engaging surfaces and self energization of the clutch will result. In many of the prior known clutch structures, when auxiliary means are provided for cooling the clutch parts, such auxiliary means are usually directionally dependent. That is, cooling is provided only when the driven end of the clutch is rotating in one direction, but not in the other.

The typical clutch is usually designed to employ such structures as thrust bearings, backup plates, or spring cages. These structures are, of course, susceptible of becoming worn and causing a malfunction in the operation of the clutch. Furthermore, such structures may be somewhat delicate in their manufacture and, therefore, expensive.

One of the major difficulties encountered in prior known clutch assemblies is that of replacing worn parts, particularly the clutch shoes or plates. Usually, such replacement requires the complete disassembly of the entire clutch.

Accordingly, it is an object of the present invention to provide a clutch which is self-cooling even under maximum design loadings and with a large amount of constant slip.

It is another object of the present invention to provide a clutch which is not susceptible of self energization and which eliminates grabbing between the engaging frictional surfaces.

Still another object of the present invention is to provide a clutch which is self-cooling, and which cooling capabilities are not directionally dependent.

Another object of the present invention is to provide a clutch wherein the replacement of worn parts, particularly the clutch shoes, can be accomplished without dismantling the entire clutch.

Still another object of the present invention is to provide a clutch which does not require thrust bearings, backup plates, or spring cages.

Still a further object of the present invention is to provide a clutch which has a predictable capacity over a wide range of operating conditions, such as with maximum design loadings thereon and during a large percentage of constant slip.

A further object of the present invention is to provide a clutch wherein overload slippage therein will not produce any substantial injury to the clutch parts.

A still further object of the present invention is to provide a clutch having relatively fewer parts, resulting in a cost reduction, over existing plate-type clutches.

These and other objects and advantages are realized from the present invention which, along with other features, in its preferred form, contemplates the utilization of the caliper principle for effecting a drive coupling between two rotatable shafts, one of which is being driven by a source of motive power and the other of which is to be coupled through the clutch to the source of motive power and connected to a machine which is to be driven. A preferred form of the present invention generally includes a rotatable disk mounted on the shaft to be driven, caliper means secured to the driving member for engaging the rotatable disk, and means for actuating the caliper means to provide a coupling between the driving member and the shaft.

A novel feature of the present invention resides in the provision of a rotatable disk which is formed by a pair of plates secured together by fan blades, with external surfaces of the plates serving as friction engaging surfaces. Shoes are provided which are actuatable by means of air mounts or air pistons or similar structures, which shoes are engageable with the external surfaces of the rotatable disk.

An important feature of the present invention resides in the provision of fan blades extending radially from a central axis between a pair of plates serving as friction engaging surfaces for cooling such plates.

Another novel feature of the present invention resides in the provision of a housing having a plurality of apertures therein for providing both cooling and access to the internal parts of the clutch assembly.

Still another novel feature of the present invention resides in the provision of a plurality of members secured to the clutch housing, which, in cooperation with the apertures in the housing, serve to cause cooling air to pass through the clutch assembly and across the working surfaces thereof.

The invention, however, as well as the above-mentioned and other objects, features and advantages thereof, will become more fully realized and understood by those skilled in the art from the following detailed description when taken in conjunction with the accompanying drawings, wherein:

FIGURE 1 is a sectional view along a longitudinal axis of the clutch assembly and illustrates one embodiment constructed in accordance with the principles of the present invention;

FIGURE 2 is an end view of the clutch assembly illustrated in FIGURE 1 which is partially broken away to illustrate several of the internal parts thereof; and FIGURE 3 is a side view in elevation of the clutch assembly of the present invention.

Like reference numerals throughout the various views of the drawings are intended to designate the same or similar structures.

With reference to the drawings in detail, and in particular to FIGURES 1 and 2, there is shown a clutch assembly constructed in accordance with the principles of the present invention. The clutch generally includes a driving end 10 disposed for connection to a source of motive power (not shown) and a driven end 12 disposed for connection to a machine (also not shown). The driving end 10 of the clutch includes a shaft 14 and a housing, generally designated with the reference numeral 16. Actuation of the clutch mechanically connects or couples the driving end 10 to the driven end 12, to provide a coupling from a suitable source of motive power to a machine.

The housing 16 of the clutch generally includes a pair of circular end walls 18 and 20 which are disposed in orthogonal relation to the longitudinal axis of the shaft 14 and of the clutch assembly. A circular center wall 22 is positioned between the two end walls 18 and 20 and is parallel thereto. An outer peripheral wall 24 extends around and is secured at one end thereof on the circular end wall 18. Another outer peripheral wall 26 extends around and is secured at one end thereof on the circular end wall 20. A pair of circular flanges 28 and 30 are each secured to the inner ends of the peripheral walls 24 and 26 respectively and engage a peripheral edge portion of the center wall 22. Bolts 32 extend through the flanges 28 and 30 and through the peripheral edge portion of the center wall 22.

A sleeve 34 is secured to the shaft 14 and extends through an aperture 36 in the circular end wall 18 and is secured thereto by suitable means, such as welding. Therefore, if the shaft 14 is rotating, the entire housing 16 including the walls 18, 20, 22, 24 and 26 will rotate therewith.

The driven end 12 of the clutch assembly includes a shaft 38 which is adapted for connection with a piece of machinery which is to be operated (not shown). The shaft 38 includes grooves 39 and a hub adaptor 40 is secured to the shaft 38 by means of keys 42 which are received in the grooves 39. Keys 42 are slidable within the grooves 39 to allow longitudinal movement of the shaft 38.

A bearing 44 is mounted on the hub adaptor 40 and is enclosed by a bearing housing 46 having end caps 48 and 50 each supporting a seal therein. The bearing housing 46 is mounted in an aperture 52 in the end wall 20 and is secured to the end wall 20 by suitable means, such as welding.

A circular flange 54 is secured to the inner end of the hub adaptor 40 and supports a disk hub 56 thereon which extends through an aperture 57 in the circular center wall 22. The inner end of the shaft 14 is journalled in the disk hub 56 by means of bearings 58 and 60. A pair of disks 62 and 64 are supported on the disk hub 56 by means of bolts 65.

Each of the disks 62 and 64 are similarly constructed and are each formed by a pair of plates 66 and 68 in parallel spaced relationship to one another which are joined by fins or fan blades 70 which extend radially from a longitudinal axis of the clutch assembly.

As shown in FIGURE 1, a pair of pivot blocks 72 are mounted on the peripheral wall 26 and, as shown in FIGURE 2, another pair of pivot blocks 74 are mounted on the peripheral wall 24 of the housing 16. The peripheral walls 24 and 26 are slotted, as indicated by the reference numeral 80 to receive the pivot blocks 72 and 74 therein, which pivot blocks are secured to the peripheral walls 24 and 26 by means of bolts 82. Each of the pivot blocks 72 and 74 supports a pair of pivot arms 84 on opposite ends thereof. The pivot arms 84 are pivotally mounted on the pivot blocks 72 and 74 by means of pins 86.

A plurality of air mounts or pistons 88 are provided in the clutch assembly of the present invention, with a pair of such air mounts 88 being mounted between each of the pivot arms 84 and a respective one of the walls 18, 20 and 22. One side of each of the air mounts 88 is secured to a respective one of the walls 18, 20 and the other side of each of the air mounts 88 is pivotally mounted to a respective one of the pivot arms 84 by means of a pin 92.

A plurality of clutch shoes 90 are provided in the clutch assembly, with each of the shoes 90 being pivotally mounted on a respective one of the pivot arms 84 by means of the pin 92. One surface of each of the shoes 90 is disposed for engaging an external surface of a respective one of the rotatable disks 62 and 64, and a pin 94 extends from the opposite surface thereof toward a respective one of the walls 18, 20, and 22. A spring 96 is disposed around each of the pins 94 and a plurality of recesses 98 are provided in a respective one of the walls 18, 20, and 22 for receiving one end of the springs 96 therein. The springs 96 provide a continuous bias to each of the shoes 90 to maintain slight frictional engagement of the shoes 90 with a surface of the rotatable disks 62 and 64.

When air is supplied to each of the air mounts 88, it expands to force the respective shoe 90 into tight frictional engagement with a surface of a respective one of the rotatable disks 62 and 64. A caliper action results from the frictional engagement of oppositely disposed shoes 90 on one of the disks 62 and 64. Upon such actuation of the air mounts 88, the housing 16 is effectively coupled to the rotatable disks 62 and 64 which are connected to the output shaft 38.

Air is supplied to each of the air mounts 88 by means of a plurality of hoses 100 which are coupled to one end of a rotary joint 102. An air supply 105 is connected to the stationary end of the rotary joint 102 through a hose 104.

The housing 16 includes a plurality of apertures 106 in each of the peripheral walls 24 and 26. As illustrated in FIGURE 2, the circular end walls 18 and 20 include a group of apertures 108 located adjacent the outer periphery thereof and a group of apertures 110 located adjacent the inner periphery thereof. As more clearly illustrated in FIGURES 2 and 3, the apertures 106 are formed by removal of a portion of the material of the outer peripheral walls 24 and 26 such that surfaces 106a and 106b are formed at an angle with respect to an intersecting radial line from the longitudinal axis. The surfaces 106a and 106b serve to pull air out the housing 16. If, for instance, the housing 16 is rotating in a clockwise direction, the surfaces 106a will force air out of the housing 16 and if the housing is rotating in a counterclockwise direction the surfaces 106b will force air out of the housing. This removal of air from the housing is assisted by the fins or fan blades 70 in each of the disks 62 and 64. The air that is withdrawn from the housing 16 enters into the housing through the apertures 108 and 110 in the end walls 18 and 20 and serves to cool the working parts of the clutch asembly. In addition, radial flanges 112 are provided at each end of the housing 16 and longitudinal flanges 114 are provided on the peripheral walls 24 and 26 for further increasing the movement of air into and out of the housing 16.

In a caliper type device, the following relationship exists:

$$T = 2\mu PR$$

where, $T$ = torque
$\mu$ = coefficient of friction (shoe)
$P$ = application force
$R$ = effective brake radius Thus, if $\mu$ is 0.5, the torque $T$ becomes proportional to the application force $P \times$ the effective brake radius $R$. That is, $T = KPR$, where $K$ = a constant for a given shoe material.

Therefore, it is important that the coefficient of friction in a caliper type device remain constant. This requires that the critical heat (generally assumed to be 400° F.) not be exceeded. It is readily apparent from these relationships that if the clutch is self-cooling, the capacity may be varied by changing either the applied force or the effective brake radius or both.

Because the clutch of the present invention is self-cooling the coefficient of friction of the shoes will remain constant over a wide operating range. Therefore, it is readily apparent that the device of the present invention incorporates the following advantages over existing plate or drum type clutches:

(1) Void of self-energization,
(2) Predictable capacity,
(3) Self-cooling,
(4) Will not grab or bind,
(5) No thrust bearing, backup plate or spring cage,
(6) Shoes may be replaced without dismantling the clutch,
(7) Overload slippage will not harm the clutch,
(8) A cost reduction over existing plate type clutches, since fewer parts are employed.

A test clutch was constructed in accordance with the principles of the present invention which was designed to operate at 250 ft. lbs., to determine the ability of the clutch to remain relatively cool under destructive conditions. Since the capacity of the clutch is dependent upon its cooling characteristics, a series of tests were conducted to determine if overheating could occur under slip conditions. The following tests and the results thereof were recorded:

(1) The clutch was operated for a 5-minute cycle at 5-minute cycle at 225 ft. lbs., clutching and declutching under a load of 20 cycles per minute. This test failed to raise the temperature of the plates 62, 64 above 77° F.

(2) The clutch was operated for a 5-minute cycle at 225 ft. lbs., with the p.s.i.g. pressure adjusted to provide 10% slip. This test failed to raise the fan temperature above 77° F.

(3) In conjunction with test No. 2 above, the slippage was raised to 20% and after 2 minutes of operating time, the temperature was recorded at 150° F. After an additional 2 minutes of operating time under these same conditions, the temperature of the fan reduced to 140° F. indicating the ability of the fan to cool itself.

(4) In conjunction with test No. 3 above, the slippage was raised to 30% (maximum motor amperage at 225 ft. lbs.) and after a 2-minute operating cycle, the temperature was recorded at 190° F. After an additional 2 minutes of operating time, the temperature reduced to 170° F.

(5) Immediately following test No. 4 above, the clutch was allowed to run an additional 2 minutes without slip and the fan temperature was recorded at 125° F.

All of the above tests were performed at 225 ft. lbs. and 600 r.p.m.

The above tests and their results indicate the ability of the clutch to remain below the critical heat of 400° F. under slip conditions. The clutch did not show any tendency to grab during these tests, and subsequent reruns of the above tests indicated no failure of the shoe material.

The results of the above tests indicate that a caliper type of clutch will maintain stability over conventional clutches primarily due to self-cooling and lack of self-energization. It is readily apparent that in accordance with the principles of the present invention clutches may be constructed employing a single fan and a single pair of calipers or a multiple number of fans and a multiple number of calipers.

The principles of the invention explained in connection with the specific exemplifications thereon will suggest many other applications and modifications of the same. It is accordingly desired that, in construing the breadth of the appended claims they shall not be limited to the specific details shown and described in connection with the exemplifications thereof.

What is claimed is:

1. A clutch comprising
   (a) a housing having an outer circular wall, a pair of end walls, and a center wall intermediate and parallel to said end walls;
   (b) a plurality of air mounts, each secured to a respective one of said end walls and said center wall;
   (c) a source of air pressure;
   (d) means for connecting said source to each of said air mounts;
   (e) a plurality of pivot arms pivotally mounted at one end of each to said housing and at the other end of each to a respective one of said air mounts;
   (f) a plurality of shoes, each secured to a respective one of said air mounts and the other end of a respective pivot arm;
   (g) a shaft rotatably mounted in one end of said housing; and
   (h) a pair of disks secured to said shaft and each being positioned between a respective one of said end walls and said center wall and between respective shoes thereon.

2. A clutch comprising:
   a housing having opposite end walls;
   a plurality of actuating means each secured to respective ones of said end walls;
   a plurality of pivot arms each having one end thereof secured to said housing and the other end thereof connected to respective ones of said actuating means;
   a plurality of shoes, each secured to a respective one of said actuating means and said other end of respective ones of said pivot arms;
   a shaft rotatably mounted in one end of said housing; and
   a disc secured to said shaft and being disposed between said end walls and between respective shoes thereon.

References Cited

UNITED STATES PATENTS

| 2,262,709 | 11/1941 | Lambert | 192—113.1 X |
| 2,759,582 | 8/1956 | Dehn | 192—85 |
| 3,002,597 | 10/1961 | Warman et al. | 192—113.1 X |
| 3,157,057 | 11/1964 | Palmer et al. | 192—113.1 X |
| 3,184,023 | 5/1965 | Hovde | 192—113.1 X |

BENJAMIN W. WYCHE III, *Primary Examiner.*